United States Patent
Magarill et al.

(10) Patent No.: US 6,709,124 B2
(45) Date of Patent: Mar. 23, 2004

(54) SCROLLING COLOR SEQUENTIAL ILLUMINATION SYSTEM

(75) Inventors: Simon Magarill, Cincinnati, OH (US); Todd S. Rutherford, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/177,022

(22) Filed: Jun. 20, 2002

(65) Prior Publication Data

US 2003/0001990 A1 Jan. 2, 2003

Related U.S. Application Data

(60) Provisional application No. 60/299,886, filed on Jun. 21, 2001.

(51) Int. Cl.[7] .............................................. F21V 21/30
(52) U.S. Cl. ...................... 362/35; 362/296; 362/293; 353/84; 348/743
(58) Field of Search ................... 362/296, 35, 293; 353/31, 33, 81, 84, 121, 37; 348/472, 473, 474, 759; 359/892, 891, 889

(56) References Cited

U.S. PATENT DOCUMENTS

| | | |
|---|---|---|
| 2,452,293 A | 10/1948 | Forest |
| 2,458,649 A | 1/1949 | Schade |
| 2,535,530 A | 12/1950 | Clark et al. |
| 5,625,738 A | 4/1997 | Magarill |
| 5,921,650 A * | 7/1999 | Doany et al. .............. 353/31 |
| 6,139,157 A | 10/2000 | Okuyuma |
| 6,266,105 B1 | 7/2001 | Gleckman |
| 6,280,034 B1 * | 8/2001 | Brennesholtz .............. 353/20 |
| 6,340,230 B1 * | 1/2002 | Bryars et al. .............. 353/31 |
| 6,361,172 B1 | 3/2002 | Brennesholtz | |
| 6,520,644 B1 * | 2/2003 | Lee .............................. 353/31 |

FOREIGN PATENT DOCUMENTS

| | | |
|---|---|---|
| EP | 0977 442 A2 | 2/2000 |
| WO | WO 01/72047 | 9/2001 |

OTHER PUBLICATIONS

Bierhuizen, Serge, "Single Panel Color Sequential Projectors with Polarization Recovery", *SID 2002*, Paper 51.5, pp. 1350–1353, 2002 (prior to Jun. 20, 2002).

Brennesholtz, Matthew S., "Color–Sequential LCoS Projector with a Rotating Drum", *SID 2002*, Paper 51.4, pp. 1346–1349, 2002 (prior to Jun. 20, 2002).

* cited by examiner

Primary Examiner—Alan Cariaso
Assistant Examiner—Ali Alavi
(74) Attorney, Agent, or Firm—Bruce E. Black

(57) ABSTRACT

Illumination systems (11) are disclosed which provide scrolling progressive color change on a liquid crystal panel (21), such as a LCoS panel. The systems use transmissive color filters (30, 31, 33) which form an assembly (13) which is rotated about a rotation axis (37). Incident light from a light source (15, 17) passes through the filters and reflects from a reflecting surface (39). As a result of this reflection, the system's optical axis (41, 43) is turned from an orientation substantially perpendicular to the rotation axis to an orientation which does not intersect a filter. Such turning of the optical axis allows colored light to be easily removed from the assembly and avoids problems with color mixing at boundaries between filters as occurs for systems in which light passes through two filters.

15 Claims, 6 Drawing Sheets

SCROLLING COLOR SEQUENTIAL ILLUMINATION SYSTEM

CROSS REFERENCE TO RELATED PROVISIONAL APPLICATION

This application claims the benefit under 35 USC §119(e) of U.S. Provisional Application No. 60/299,886, filed Jun. 21, 2001, and entitled "Color Cylinder," the contents of which are incorporated herein in their entirety.

BACKGROUND OF THE INVENTION

1. Field of the Invention

This invention relates to illumination systems for projection devices and, in particular, relates to scrolling color sequential projection devices, e.g., scrolling color sequential projection devices employing liquid crystal panels.

2. Description of the Prior Art

Color sequential systems are widely used in the projection industry. Every single chip DLP projector has a color wheel, which is commercially available as an off-the-shelf unit. Typically, the color wheel is located at the hot spot of the lamp where the size of the light spot is the smallest. This location provides the fastest color change for the entire panel.

Liquid crystal displays and, in particular, LCoS displays cannot operate as fast as DLP displays. This slower operation is associated with the liquid crystal relaxation time and leads to a significant reduction of projection system efficiency. To increase the light efficiency of the system, it has been suggested to change colors not frame by frame but row by row. This progressive row-at-a-time way of operating a color sequential system substantially doubles the light output.

One example of the application of color sequential illumination to a projection device employing a liquid crystal panel appears in U.S. Pat. No. 6,266,105 B1 (the '105 patent), which was published as EPO Patent Publication No. EP 0 977 422 A2 on Feb. 2, 2000.

In contrast to the present invention, the system disclosed in the '105 patent employs reflective, as opposed to transmissive, color filters. As discussed in Brennesholtz, Matthew S., "Color-Sequential LCoS Projector with a Rotating Drum", *SID* 2002, Paper 51.4, pp. 1346–1349, 2002, reflective color filters of the type disclosed in the '105 patent suffer from poor efficiency and colorimetry.

SUMMARY OF THE INVENTION

In view of the foregoing, the present invention is directed to providing color sequential illumination systems (color scanning systems) which are capable of scrolling bands of colored light across the surface of a panel, e.g., across the surface of a liquid crystal panel such as a LCoS panel. In particular, the present invention is directed to providing scrolling illumination systems which are simple to construct and operate and which achieve sufficiently high levels of color separation between color bands to produce high quality projected images.

In accordance with a first aspect, the invention provides apparatus for producing scrolling bands of colored light (e.g., bands 25 and 27 in FIG. 3) comprising:

(a) an assembly (13) adapted to be rotated about an axis (37), said assembly comprising a plurality of transmissive color filters (e.g., 30, 31, 33) which extend along the axis and define an internal volume (49), a periphery (45), and two opposing ends (47); and (b) a reflecting surface (39) located at least partially within the internal volume (49) for receiving light which has passed through the periphery (45) and reflecting said light out of one of said ends (47), said reflecting surface (39) being adapted to remain stationary as the assembly (13) rotates about the axis.

In accordance with other aspects, the invention provides a scrolling method comprising:

(a) providing a plurality of color filters (e.g., 30, 31, 33), each filter producing transmitted light from received light;

(b) repetitively passing the filters in front of a light source (e.g., 15, 17) by transporting the filters in a substantially circular path about a rotation axis (37), said light source having an optical axis (41) which is substantially perpendicular to said rotation axis (37); and (c) turning the optical axis of the transmitted light produced by the filters so that said axis (43) does not pass through a filter.

Additional features and advantages of the invention are set forth in the detailed description which follows, and in part will be readily apparent to those skilled in the art from that description or recognized by practicing the invention as described herein.

It is to be understood that both the foregoing general description and the following detailed description are merely exemplary of the invention, and are intended to provide an overview or framework for understanding the nature and character of the invention as it is claimed.

The accompanying drawings are included to provide a further understanding of the invention, and are incorporated in and constitute a part of this specification. The drawings illustrate various embodiments of the invention, and together with the description serve to explain the principles and operation of the invention.

Figure 1:
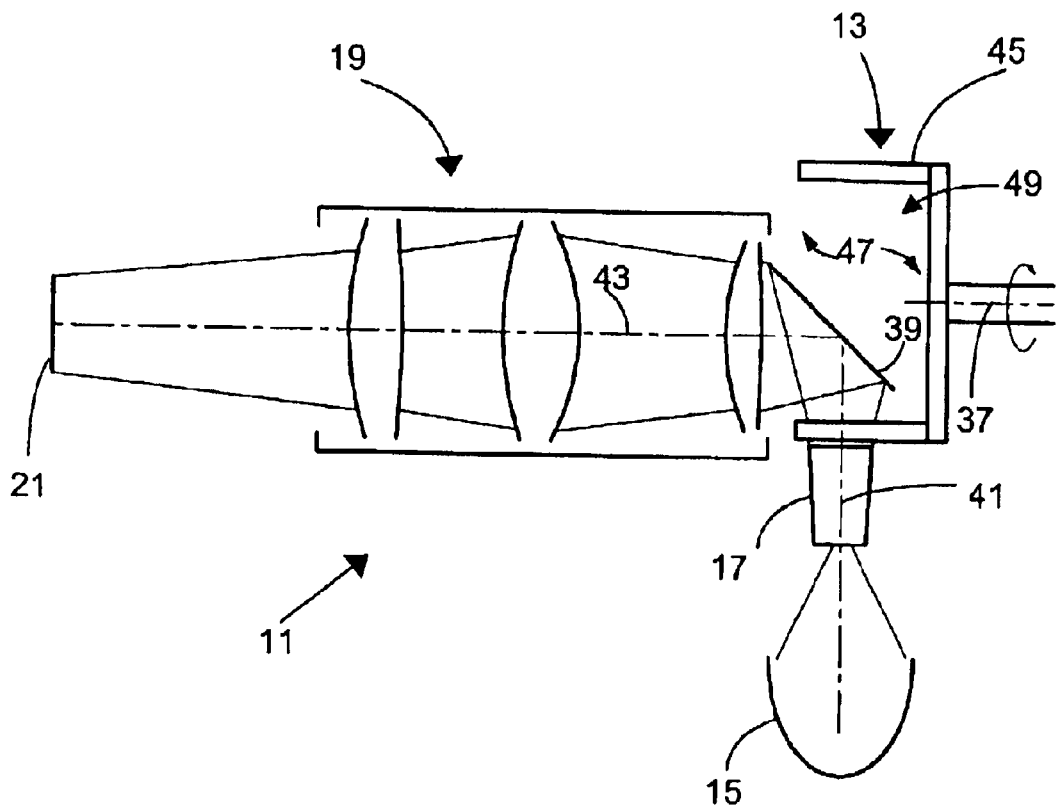
FIG. 1 is a schematic drawing of an illumination system layout in accordance with the invention.

The reference numbers used in the drawings correspond to the following:

| | |
|---|---|
| 11 | illumination system |
| 13 | rotatable assembly |
| 15 | lamp |
| 17 | integrator |
| 19 | relay |
| 21 | panel, e.g., LCoS panel |

-continued

| | |
|---|---|
| 23 | active area of panel 21 |
| 25 | red illuminated area (red band) of active area 23 |
| 27 | green illuminated area (green band) of active area 23 |
| 29 | black area of active area 23 |
| 30 | red transmissive filter |
| 31 | blue transmissive filter |
| 33 | green transmissive filter |
| 35 | opaque strip |
| 37 | rotation axis of rotatable assembly |
| 39 | reflecting surface |
| 41 | optical axis of illumination system prior to reflecting surface |
| 43 | optical axis of illumination system after reflecting surface |
| 45 | periphery |
| 47 | end |
| 49 | internal volume |
| 51 | segment |
| 53 | straight edge |
| 55 | angle-ground edge |

DESCRIPTION OF THE PREFERRED EMBODIMENTS

As discussed above, the present invention is directed to Illumination systems which provide scrolling progressive color change, e.g., row-by-row color change, on a liquid crystal panel, such as a LCoS panel.

The systems use transmissive color filters (30, 31, 33) which form an assembly (13) which is rotated about a rotation axis (37). Incident light from a light source (15, 17) passes through the filters and reflects from a reflecting surface (39). As a result of this reflection, the system's optical axis is turned from an orientation substantially perpendicular to the rotation axis to an orientation which does not intersect a filter. Such turning of the optical axis allows colored light to be easily removed from the assembly and avoids problems with color mixing at boundaries between filters as occurs for systems in which light passes through two filters. See U.S. Pat. No. 6,361,172 which was published as PCT Patent Publication No. WO 01/72047 on Sep. 27, 2001.

A layout of the illumination system of the invention is shown in FIG. 1. As illustrated in this figure, the system 11 preferably comprises a lamp 15, an integrator 17 (see Apparatus For Uniformly Illuminating a Light Valve, U.S. Pat. No. 5,625,738 dated Apr. 29, 1997), a rotatable assembly 13, and an optical relay 19. The lamp 15 has an elliptical reflector, which focuses the light on the entrance window of the integrator 17. The relay 19 creates an image of the uniformly illuminated integrator exit window on the active area of the panel 21.

The optical relay shown in FIG. 1 can include various conventional components of an illumination system, such as a UV filter, a cold mirror, and/or a polarization conversion system. See, for example, U.S. Pat. No. 6,139,157. One or more of these components can, of course, be placed in other portions of the system besides the relay. Also, the components are optional and can be omitted if desired. Similarly, additional components can be included in the system without departing from the spirit and scope of the invention.

As shown in FIG. 1, rotatable assembly 13 is designed to be rotated around an axis 37 parallel to the long side of the integrator exit window. The outer periphery 45 of the rotatable assembly is preferably located near the integrator exit window at a distance just large enough for mechanical clearance between the integrator and the assembly.

Reflecting surface 39 can be, for example, the front surface of a mirror or the diagonal of a prism at which total internal reflection takes place. Prisms are generally more expensive than mirrors but are more efficient even though the light path through the prism includes two additional air/glass interfaces. Also, prisms can reduce the beam size which can be desirable for some applications of the invention.

Figure 2:
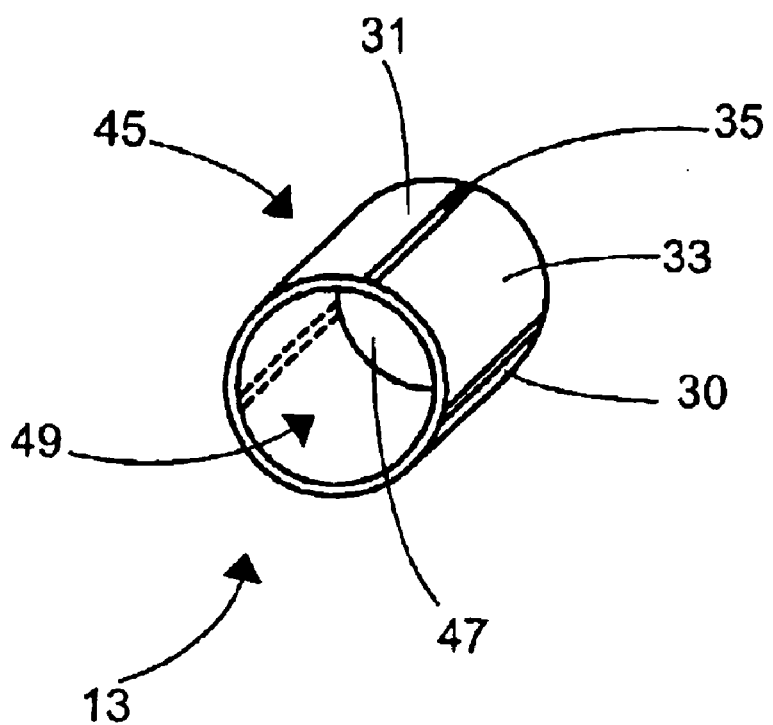
FIG. 2 is perspective drawing of a first embodiment of a rotatable assembly constructed in accordance with the invention.

FIG. 2 shows the structure of a first embodiment of rotatable assembly 13 in the form of a color cylinder, i.e., the rotatable assembly has a cylindrical periphery 45. The outer surface of the cylinder consists of three primary zones (30, 31, 33) separated by opaque strips (35). These strips are oriented parallel to the cylinder's axis. Each primary zone has a different dichroic filter, which determines the color of the light which passes through the cylinder wall (red, green or blue).

Figure 3:
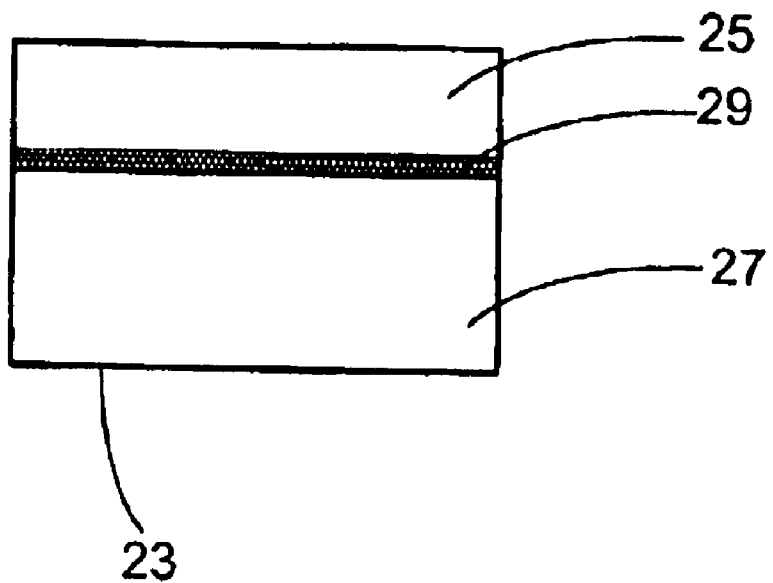
FIG. 3 is a schematic drawing illustrating color scrolling across the active area of a LCoS as a result of the rotation of the rotatable assembly of FIG. 1.

As the assembly rotates, the opaque strips move along the short side of the integrator's exit window. This movement creates the effect of progressive (row-by-row) changing of the color on the active area 23 of the panel 21 (see FIG. 3).

The circumferential lengths of the red, green, and blue zones are picked to satisfy the system's specification for white color coordinates, e.g., x=0.30 and y=0.31. The circumferential length of the opaque strips are picked based on the relaxation time of the liquid crystal material used in the panel so as to achieve the system's specification for color purity of the projected image.

For the rotatable assembly of FIG. 2, several dichroic zones need to be produced on the same piece of glass. This can make large scale manufacturing expensive. In particular, if something goes wrong in the process of depositing the last dichroic structure on the glass cylinder, the entire unit needs to be discarded. This decreases manufacturing yield and increases the cost of the component.

Figure 4:
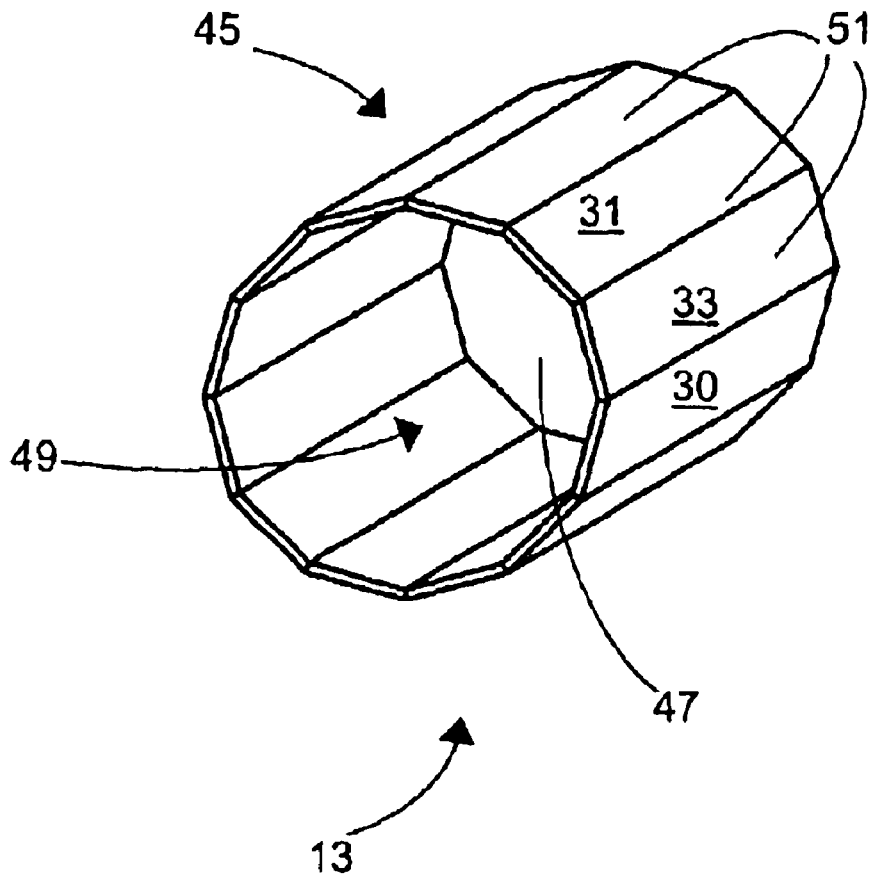
FIG. 4 is a schematic drawing of a second embodiment of a rotatable assembly constructed in accordance with the invention.

Another version of the rotatable assembly 13 of FIG. 1 which avoids this manufacturing problem is shown in FIG. 4. In this case, the assembly comprises a plurality of plano-parallel plates or segments 51.

Figure 5:
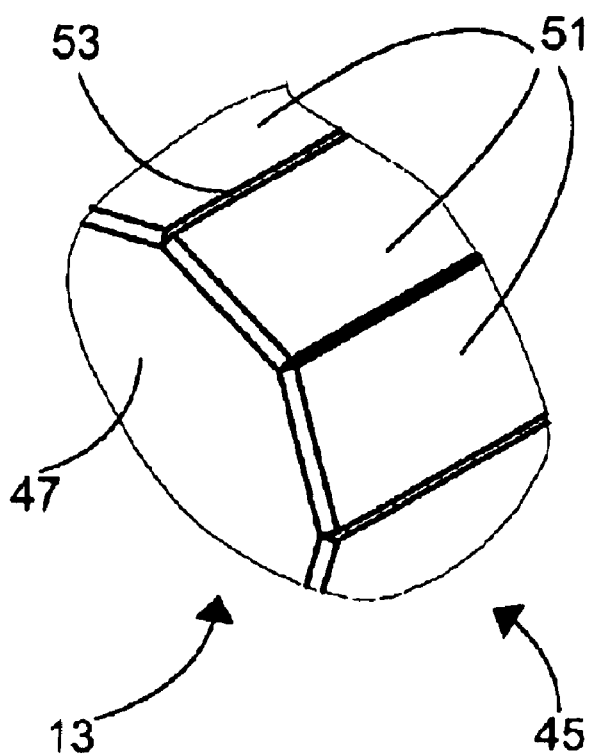
FIG. 5 is a enlarged drawing of a portion of the rotatable assembly of FIG. 4 illustrating the use of straight edges between segments.
Figure 6:
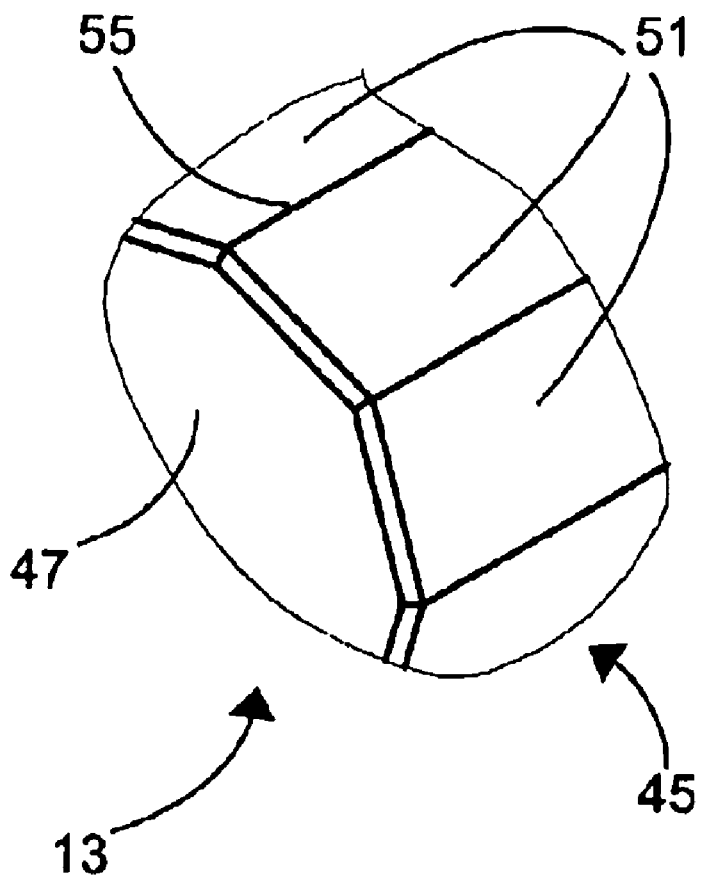
FIG. 6 is a enlarged drawing of a portion of the rotatable assembly of FIG. 4 illustrating the use of angle-ground edges between segments.

Each plate has an appropriate transmissive dichroic coating, e.g., red, green, or blue. To form the assembly, the plates can be glued together or can be mechanically affixed to a suitable housing. As shown in FIGS. 5 and 6, the edges of individual plates can be straight or can be angle-ground so that they mate with one another.

If the filter plates have straight edges (FIG. 5), there will be gaps between them when they are assembled to form the periphery of the assembly. These gaps will allow some white light to pass through and could reduce the contrast or color purity of the display. In such a case, the gap regions can be blocked using a black paint or other opaque material. Such blocking may be preferable if the imager requires the illumination to be blocked between sequential color fields (see FIG. 3). However, the blocking will reduce the total light throughput.

Alternately, as shown in FIG. 6, the filter segments may have edges which are ground with an appropriate angle so that they can mate and leave a minimal gap between the filter plates. This allows the maximum amount of light through, although it can increase fabrication cost.

The number of segments used is determined by several competing factors. The first consideration is the cost of fabricating a rotatable assembly. Having a larger number of segments makes the device more expensive. Thus, from a cost point of view, a design with fewer segments is preferable.

The second factor is the diameter of the assembly, which is approximately proportional to the number of segments. At a minimum, the number of segments must be great enough so that the assembly will have a diameter large enough to receive reflecting surface 39 as shown in FIG. 1.

The third factor is the rotation speed of the assembly. The number of revolutions per minute that is needed to match the frame rate of the imager is inversely proportional to the number of segments. So from this point of view, a larger number of filters (segments) is preferable.

Whether continuous or segmented, the color modulators of the invention provide an easy way to maintain the required proportion between the three primary colors. This is important because the typical high-pressure mercury arc lamp (UHP type) is deficient in red light. To obtain a required white point, one needs to increase the relative amount of red light which reaches the panel and decrease the relative amount of green and blue light. Changing the relative size of individual filters can do this. Alternatively, in the case of a segmented design, some adjacent segments can filter the same color (e.g., blue, green, red, red, blue, green, red, red . . . ) rather than changing color (e.g., blue, green, red, blue, green, red . . . ).

Although specific embodiments of the invention have been described and illustrated, it is to be understood that modifications can be made without departing from the invention's spirit and scope. For example, although dichroic filters are preferred, absorption filters can also be used in the practice of the invention. Also, although it is preferred that the entire periphery of the rotatable assembly performs filtering (except for any intentionally opaque areas that may be used), non-filtering regions/segments (e.g., clear regions/segments) can be included if desired.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed is:

1. Apparatus for producing scrolling bands of colored light on an active area of a panel of a projection device comprising:
   (a) an assembly which receives light from a light source and is adapted to be rotated about an axis, said assembly comprising a plurality of transmissive color filters which extend along the axis and define an internal volume, a periphery, and two opposing ends;
   (b) a reflecting surface located at least partially within the internal volume for receiving light which has passed through the periphery and reflecting said light out of one of said ends, said reflecting surface being adapted to remain stationary as the assembly rotates about the axis; and
   (c) an optical relay which receives light reflected out of said one of said ends and transmits said light to the active area of the panel;
   wherein rotation of the assembly about the axis produces a progressive, row-by-row, changing of color on the active area of the panel.

2. The apparatus of claim 1 wherein the transmissive color filters are dichroic filters.

3. The apparatus of claim 1 wherein the transmissive color filters substantially abut one another.

4. The apparatus of claim 1 wherein the transmissive color filters are separated from one another by opaque strips.

5. The apparatus of claim 1 wherein the periphery is substantially circular.

6. The apparatus of claim 1 wherein the periphery is segmented.

7. The apparatus of claim 6 wherein adjacent filters have mating angle-ground edges.

8. A scrolling method for producing scrolling bands of colored light on an active area of a panel of a projection device comprising:
   (a) providing a plurality of color filters, each filter producing transmitted light from received light;
   (b) repetitively passing the filters in front of a light source by transporting the filters in a substantially circular path about a rotation axis, said light source having an optical axis which is substantially perpendicular to said rotation axis;
   (c) turning the optical axis of the transmitted light produced by the filters so that said axis does not pass through a filter; and
   (d) applying the transmitted light whose optical axis has been turned to the active area of the panel to produce a progressive, row-by-row, changing of color on said active area.

9. Apparatus for producing scrolling bands of colored light on an active area of a panel of a projection device comprising:
   (a) a light source which comprises:
      (i) a lamp; and
      (ii) an integrator which has an exit window;
   (b) an assembly which receives light from the light source and is adapted to be rotated about an axis, said assembly comprising a plurality of transmissive color filters which extend along the axis and define an internal volume, a periphery, and two opposing ends;
   (c) a reflecting surface located at least partially within the internal volume for receiving light which has passed through the periphery and reflecting said light out of one of said ends, said reflecting surface being adapted to remain stationary as the assembly rotates about the axis; and
   (d) an optical relay which receives light reflected out of said one of said ends and transmits said light to the active area of the panel, said optical relay creating an image of the integrator's exit window on said active area of the panel;
   wherein rotation of the assembly about the axis produces a progressive, row-by-row, changing of color on the active area of the panel.

10. The apparatus of claim 9 wherein the transmissive color filters are dichroic filters.

11. The apparatus of claim 9 wherein the transmissive color filters substantially abut one another.

12. The apparatus of claim 9 wherein the transmissive color filters are separated from one another by opaque strips.

13. The apparatus of claim 9 wherein the periphery is substantially circular.

14. The apparatus of claim 9 wherein the periphery is segmented.

15. The apparatus of claim 14 wherein adjacent filters have mating angle-ground edges.

* * * * *